Nov. 27, 1962 G. W. MEEK 3,065,956
GAS AND LIQUID CONTACT APPARATUS
Filed March 5, 1959 3 Sheets-Sheet 1
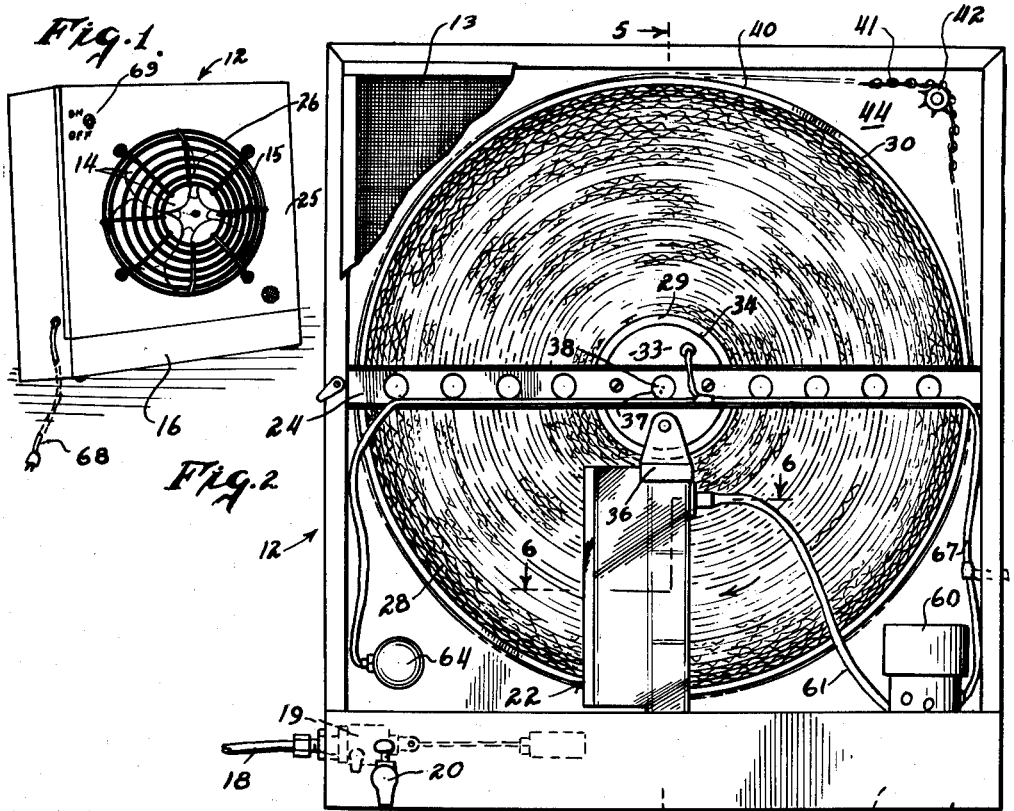
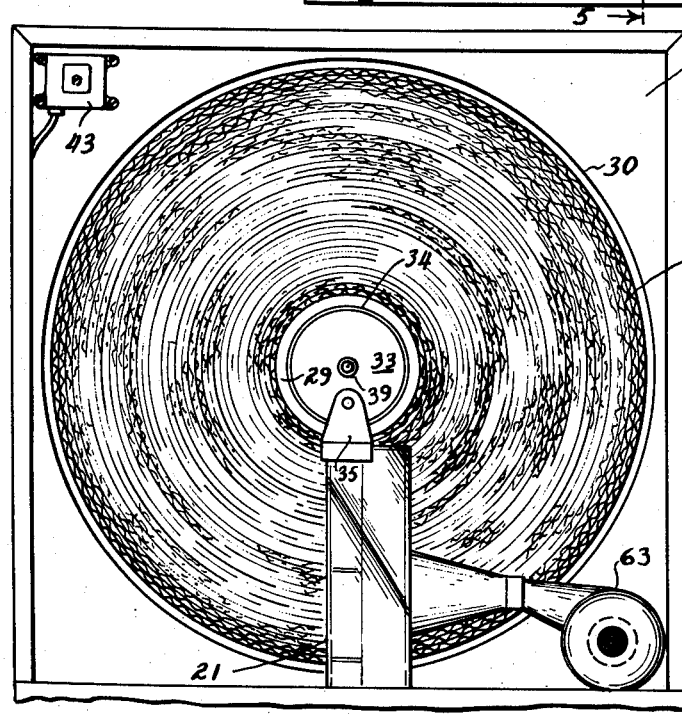
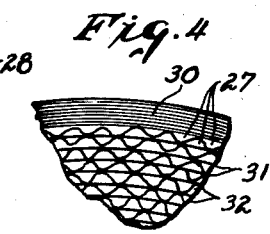
INVENTOR.
GEORGE W. MEEK
ATTORNEY Nov. 27, 1962 G. W. MEEK 3,065,956
GAS AND LIQUID CONTACT APPARATUS
Filed March 5, 1959 3 Sheets-Sheet 2

INVENTOR.
GEORGE W. MEEK

BY
ATTORNEY

Nov. 27, 1962   G. W. MEEK   3,065,956
GAS AND LIQUID CONTACT APPARATUS
Filed March 5, 1959   3 Sheets-Sheet 3
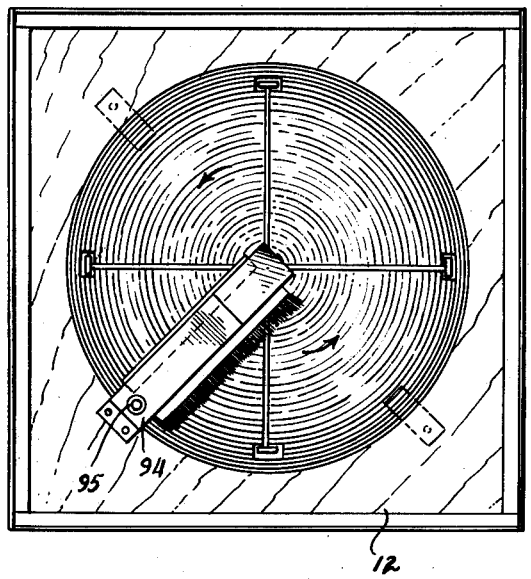
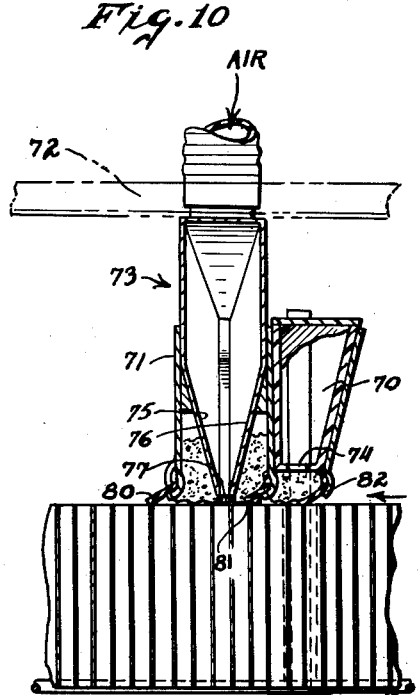
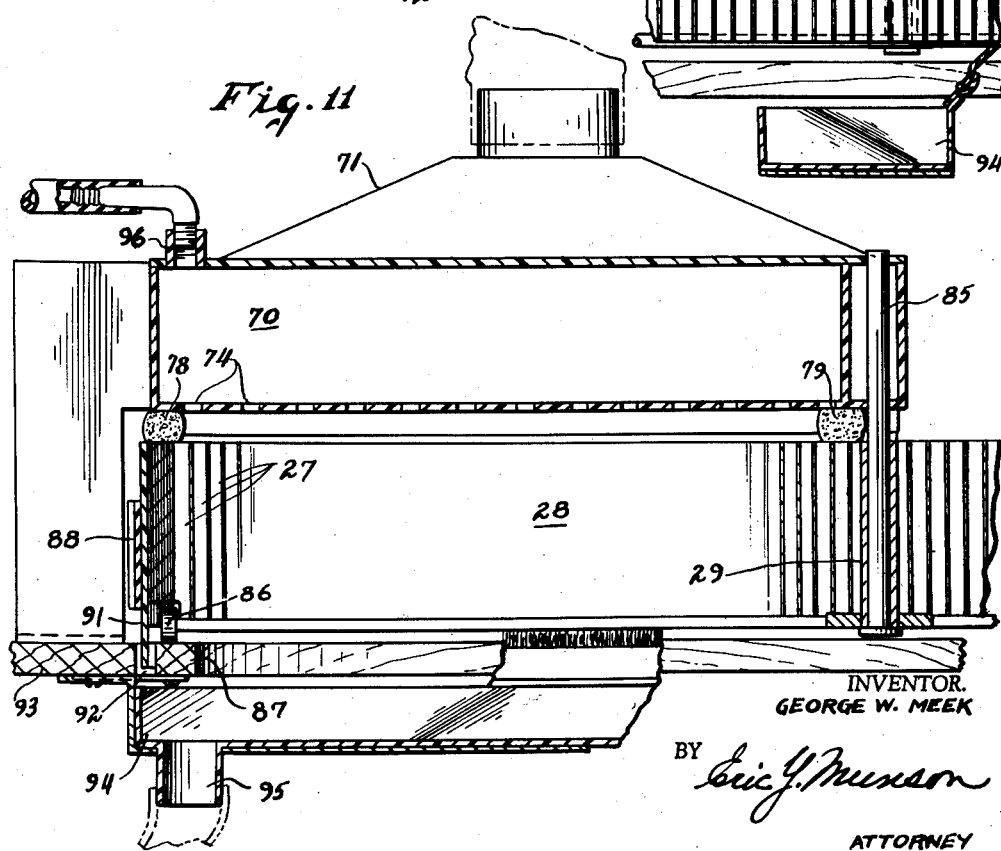
INVENTOR.
GEORGE W. MEEK
BY
ATTORNEY

United States Patent Office 3,065,956
Patented Nov. 27, 1962

3,065,956
GAS AND LIQUID CONTACT APPARATUS
George W. Meek, Pelham, N.Y., assignor to Lizenzia
A.G., Zug, Switzerland, a Swedish corporation
Filed Mar. 5, 1959, Ser. No. 797,465
7 Claims. (Cl. 261—29)

The present invention relates to gas and liquid contact apparatus and more particularly to an apparatus for treating a gas by evaporating a liquid therein.

There are many industrial and commercial processes where a liquid is evaporated into a gas or gaseous mixture. For example, it is often desirable to add moisture to the air in a textile mill to reduce static electricity and properly condition textile fibers for processing. In other instances it is desirable to evaporate liquids into a stream of air or other gas for treating a product or producing a chemical reaction.

Another common use of gas and liquid contact apparatus is to cool or humidify a stream of air by evaporating water therein to air condition an enclosure. Such air conditioning units are known as evaporative coolers, swamp coolers, desert coolers, etc. and are in common use in the arid southwestern areas of the United States to cool the hot, dry air by merely evaporating water thereinto. Such evaporative coolers usually comprise a box filled with a loose air pervious packing material such as excelsior. The water is distributed over the top of the packing and flows therethrough by gravity and a stream of air is blown through the packing which evaporates the water. As the water evaporates, part of the sensible heat in the air is converted to latent heat which reduces the temperature of the air.

Such evaporative coolers are far from satisfactory. One of the most common faults is the growth and presence of mold, bacteria and algae in the packing which are apt to cause souring and a bad odor as well as a rotting of the packing material. In areas where the water has a high mineral content, the formation and accumulation of scale reduces the air passages and the rate of flow which results in poor performance of the unit. Because of such scaling it is difficult to control the flow of water to the packing as the scale progressively plugs the holes in the liquid distributing troughs or tubes. Another fault is the gradual sagging and compacting of the packing material, such as excelsior, into a more or less solid mass which reduces the area of available heat transfer surface and increases the resistance to the flow of air with a resulting loss in capacity. As a result of these faults evaporative coolers in general have a bad reputation and are regarded as a makeshift arrangement which is not as reliable or as desirable as the more expensive and complicated mechanical compression type air conditioners.

One of the objects of the present invention is to provide a gas and liquid contact apparatus of improved construction which prevents the accumulation of scale and slime.

Another object is to provide an apparatus of the type indicated which removes surplus liquid from the packing to prevent entrainment of liquid into the stream of gas flowing through the packing.

Another object is to provide an improved air conditioning apparatus for an enclosure having a packing for evaporating water into a stream of air which is of a non-corrosive, rot-resisting material and providing a large surface area per unit of volume.

Still another object is to provide a gas and liquid contact apparatus of the type indicated which is of simple and compact construction, economical to manufacture, reliable in operation and adapted for use over long periods of time without repair or replacement of the packing or any decrease in the capacity of the unit.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a perspective view of a gas and liquid contact apparatus incorporating the novel features of the present invention;

FIGURE 2 is an enlarged rear view of the unit illustrated in FIGURE 1 and showing the packing in a rotating wheel and the pump for supplying liquid to the radial arm at one side of the wheel;

FIGURE 3 is a view similar to FIGURE 2 showing the oposite side of the wheel and the blower for supplying a stream of air to the radial arm at the opposite side of the wheel;

FIGURE 4 is a side elevational view of a fragment of the wheel and showing the alternate plain and corrugated sheets forming a plurality of adjacent tubular passages in the wheel;

FIGURE 9 is a bottom plan view of the wheel illustrated in FIGURE 7 and showing the radial drain trough underlying the liquid and air distributing means;

FIGURE 10 is a transverse sectional view taken on line 10—10 of FIGURE 7 to show the adjacent liquid and air distributing means overlying the upper face of the wheel and the drain trough at the underside of the wheel; and FIGURE 11 is an enlarged transverse sectional view taken on line 11—11 of FIGURE 7 to show the mounting for the wheel and arrangement of elements.

Figure 5:
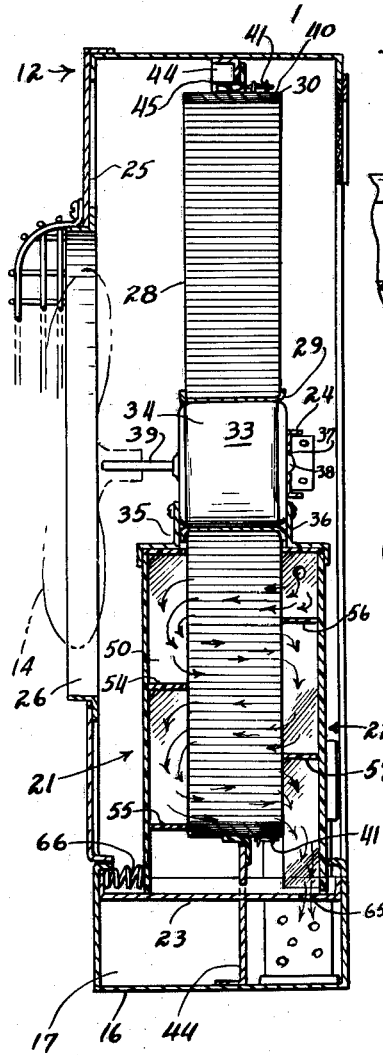
FIGURE 5 is a transverse sectional view of the unit taken on line 5—5 of FIGURE 2 to show the tortuous path formed by baffles in the arms at opposite sides of the wheel for directing liquid back and forth through the passages in the wheel.

Referring now to the drawings, the invention is illustrated in FIGURES 1 to 6 as applied to a window type air cooling unit for purposes of illustration, but it is to be understood that the invention can be used in commercial and industrial types of gas and liquid contact apparatus for evaporating a liquid into a gas, or as one component of an air conditioning system. The air cooling unit illustrated in FIGURES 1 to 6 comprises a rectangular casing 12 adapted to be mounted in a window or other opening in the wall of a building. Thus, one side of the casing 12 is exposed to the ambient atmosphere at the outside of the building while the opposite side faces into the room to be conditioned. The side of casing 12 exposed to the ambient is covered with a screen 13 as illustrated in FIGURE 2 and the side at the interior of the room has a closure panel 25 with a circular outlet opening 26 therein as illustrated in FIGURE 5. An induction fan 14 rotates in the circular outlet opening 26 and is covered by a fan guard 15.

The base 16 of the rectangular casing 12 is of hollow construction and formed to provide a sump 17. Water is supplied to sump 17 through a line 18 as controlled by a float valve 19 to maintain water at a substantial constant level in the sump. A drain cock 20 also is provided for draining the sump when required. The casing 12 also comprises spaced arms 21 and 22 projecting upwardly from the base 16 and supported by plate 23 extending across the top of the sump, see FIGURE 5. In addition a cross strut 24, see FIGURE 2, extends across the casing 12 between its opposite sides and above the arm 22.

The gas and liquid contact packing is in the form of a wheel 28 mounted to rotate in the casing 12. The wheel 28 comprises an inner hub 29 and an outer rim 30 with alternate plain and corrugated sheets wound helically between the hub and rim. The sheets may be formed of paper impregnated with a phenol resin which renders then absorbent and stiff enough to resist deformation as well as resistant to organic growth and rot. As shown in FIGURE 4, the plain and corrugated sheets divide the entire area of the wheel 28 between the hub 29 and rim 30 into a plurality of adjacent tubular passages 27 separated by the thin paper walls and which extend through the wheel from one face to the other parallel to the axis. The wheel construction thus provides a large surface area per unit of volume. Such a cellular construction in a stationary packing for a cooling tower is described and claimed in U.S. Letters Patent to Carl G. Munters, Patent No. 2,809,818, issued October 15, 1957.

The inner hub 29 of wheel 28 is formed by winding a paper strip tightly around a mandrel and impregnating the wound strip with a suitable binder, such as phenol resin, to form a hard solid bearing surface. The outer rim 30 is similarly formed. Preferably, the opposite faces of the wheel 28 are dipped in a suitable mineral solution, such as sodium silicate, which sets to form a hard bearing surface at each face.

Wheel 28 is mounted to rotate on a horizontal axis by a unique arrangement of elements, as shown in FIGURE 5. This mounting comprises an electric motor 33 having a cylindrical casing 34 forming an axle for the wheel 28. Motor 33, in turn, is mounted on brackets 35 and 36 projecting upwardly from the spaced arms 21 and 22 and attached to the opposite sides of the motor. In addition, the motor 33 is steadied by the cross strut 24 which has a circular recess 37 forming a bearing surrounding a boss 38 projecting from one side of the motor casing. Thus, the wheel 28 is mounted to rotate on the cylindrical casing 34 of the motor 33 between the spaced arms 21 and 22 projecting upwardly from the base 16 of the casing 12 radially of the wheel. Motor 33 has an axial shaft 39 which mounts the fan 14 at one side of the wheel 28 for inducing a flow of air from the outside ambient through the passages 27 in the wheel into the room to be conditioned. Such a construction provides a window type air conditioning unit which is extremely compact and having a thickness only slightly greater than the thickness of the wheel 28 and arms 21 and 22. The rim 30 of the wheel 28 is provided with sprocket teeth 40 on its outer periphery, see FIGURES 2, 3 and 5, and a chain 41 surrounds the wheel and a driving sprocket 42. Sprocket 42 is driven by a motor 43 through a suitable reduction gear box, see FIGURE 2, to rotate the wheel at a slow rate of, for example, one third of a revolution per minute.

A medial partition wall 44 projects inwardly from the periphery of the rectangular casing 12 and has a flexible sealing gasket 45 engaging the rim 30 of wheel 28 to seal the joint therebetween. Thus, air drawn from the outside ambient by the induction fan 14 flows through the screen 13 and tubular passages 27 of the wheel 28 and through the circular outlet opening 26 in the casing panel 25 and into the room and the air is prevented from by-passing the wheel 28 by the partition 44 and sealing gasket 45.

Figure 6:
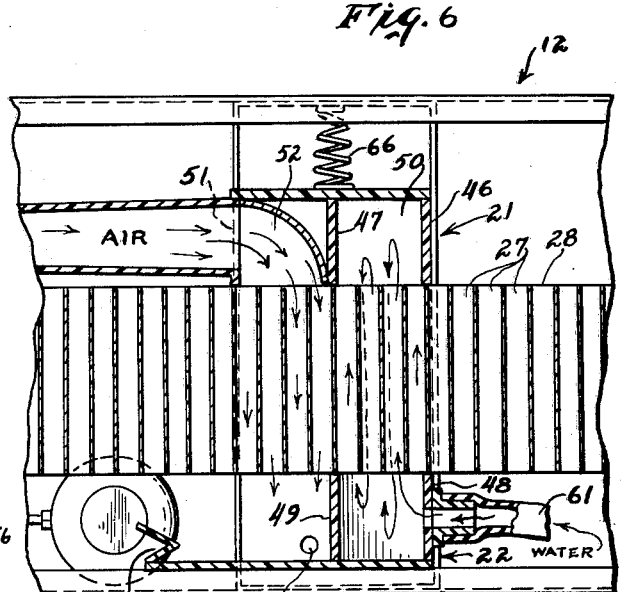
FIGURE 6 is a sectional view taken on line 6—6 of FIGURE 2 to show the path in the radial arms adjacent the liquid path for blowing surplus liquid from the passages in the packing.

Each of the spaced arms 21 and 22 at opposite sides of the wheel 28 is of hollow channel-shaped construction, as shown in FIGURES 5 and 6. Arms 21 and 22 have vertical side flanges 46, 47 and 48, 49, respectively, engaging and bearing against the opposite faces of the wheel, see FIGURE 6, which cooperate with passages 27 in wheel 28 to form a liquid distributing chamber 50. In addition, the arm 21 has a vertical flange 51 engaging the face of the wheel 28 and cooperating with the flange 47 and passages 27 in the wheel to form an air distributing chamber 52 adjacent the liquid distributing chamber 50, see FIGURE 6. The side of chamber 52 in arm 22 opposite flange 51 is open to the ambient atmosphere and has a V-shaped baffle 53 at its end. Each of the chambers 50 and 52 extends radially from the hub 29 of the wheel 28 to the base of the rectangular casing 12.

As shown in FIGURE 5, the portion of the arms 21 and 22 constituting the liquid distributing chamber 50 each have horizontal flanges 54, 55 and 56, 57, respectively. The horizontal baffles 54 and 55 in the arm 21 are offset with respect to the baffles 56 and 57 in the opposite arm 22 and bear against the face of the wheel 28 to form a continuous tortuous path back and forth through the passages 27 in the wheel radially from the hub 29 to the rim 30. A water pump and motor 60, see FIGURE 2, is mounted on the base of the rectangular casing 12 at the outside face of the wheel 28 for pumping water from the sump 17 through a line 61 to the chamber 50 in one arm 22 adjacent the hub 29. The water flows in a stream through the passages 27 back and forth across the wheel 28 as controlled by baffles 54, 55 and 56, 57 and as indicated by the arrows in FIG. 5, returns to the sump 17 through suitable drain openings 65 (only one shown) in the plate 23 overlying the sump. The continuous flow of the stream of water washes away any precipitated minerals or other material which might otherwise tend to accumulate in the passages 27. In addition, the stream of water completely fills each of the passages 27 to thoroughly wet all surfaces of the walls forming the passages.

A blower 63 is mounted in the casing 12 adjacent the inside face of the wheel 28, see FIGURE 3, and delivers air to the air distributing chamber 52 in the arm 21. Blower 63 is driven by a motor 64 at the opposite side of the partition wall 44 and having a shaft extending therethrough. The air under pressure in chamber 52 flows from arm 21 to arm 22, blows surplus water from the passages 27 as they move from the liquid distributing chamber 50 to insure opening of all of the passages and avoid any entrainment of liquid into the air stream circulated by the fan 14. Thus, the air supplied by the blower 63 flows from the room side of the air cooling unit through the passages 27 in the wheel 28 and is discharged to the outside ambient together with the water blown from the passages. The arm 22 provides a side wall against which the air stream impinges as it leaves the passages 27 in wheel 28 to separate the water from the air. The water flows down the wall and through the opening 65 in the plate 23 into the sump 17 and the air escapes along the side of the wheel to the ambient atmosphere. As shown in FIGURES 5 and 6, the arm 21 is pressed into engagement with the face of wheel 28 by a suitable spring 66 which, in turn, holds the face of the wheel in engagement with arm 22.

As shown in FIGURES 1 and 2, electric conductors 67 extend from a plug-in cord 68, see FIGURE 1, to the motors 33, 43, 60 and 64 for simultaneous energization by an electric control switch 69. One form of the invention having now been described in detail the mode of operation is explained below.

It is assumed for purposes of description, that the casing 12 is mounted in a window or other wall opening of a room with the side having the fan 14 facing into the room and the opposite side facing the ambient atmosphere; the electric plug 66 is connected to an electrical outlet; and the water line 18 is connected to a water supply and controlled by float valve 19 to fill the sump 17 to the level L.

When cooling is desired the electric switch 69 is actuated to simultaneously energize the electric motor 33 for the fan 14, the motor 43 for rotating the wheel 28, the motor for operating the water pump 60 and motor 64 for driving the blower 63. Water pump 60 pumps water from the sump 17 and delivers it through the conduit 61 to the liquid distributing chamber 50 adjacent the hub 29 of the wheel 28. The water flows in its tortuous path back and forth through the passages 27 in the wheel 28 radially from its hub 29 to its rim 30 as controlled by the baffles 54 to 57 in the liquid distributing chamber 50 to completely flood the passages over the narrow area between the vertical flanges 46, 48 and 47, 49, see FIGURE 6. The stream of water completely fills the passages 27 of wheel 28 to thoroughly wet all wall surfaces of the passages. Due to the continuous flow of a relatively large stream of water through the passages 27 any minerals tending to precipitate from the water are washed away from the wall surfaces together with any other solids or slimes which may be present. The water flows from the outer periphery of the wheel 28 onto the plate 23 in the base 16 of the casing 12 and through hole or holes 65 in the plate back to the sump 17.

Simultaneously with the operation of pump 60 to flood the passages 27, the wheel 28 is rotated by motor 43 at a slow rate, of, for example, one third of a revolution per minute to move the flooded passages from the liquid distributing chamber 50 into the air distributing chamber 52, see FIGURE 6. As each passage 27 of the wheel 28 moves through the air distributing chamber 52, a stream of air from the blower 63 flows outwardly through the passages at high velocity and blows surplus water therefrom. The stream of air and entrained water impinges the plate of arm 22 at the outside of chamber 52 to separate the water from the air. The water flows down the side of the plate onto the drain pan 23 and through the holes 65 in the drain pan into the sump 17. The air escapes to the ambient atmosphere. Such flow of air through the passages 27 produces some evaporative cooling to cool the wheel 28. However, sufficient water remains in the walls of each passage 27 to produce the major portion of its cooling after it leaves the arms 21 and 22.

Induction fan 14 operates simultaneously with the rotation of wheel 28 to produce a flow of ambient air from outside the enclosure through the passages 27 of the wheel 28 at all areas except that covered by the narrow radial arms 21 and 22. The ambient air flowing through the passages 27 evaporates the water absorbed by the walls of the packing as it flows through the wheel and is discharged into the enclosure. Such evaporation of the water converts sensible heat in the air to latent heat of vaporization and thereby reduces its temperature. For example, every pound of water evaporated requires approximately one thousand B.t.u.'s which is converted from sensible heat of the air entering the wheel to latent heat of evaporation with a corresponding decrease in temperature. Due to the fact that all surplus water is removed by means of the air distributing chamber 52 the water is evaporated directly from the walls of the passages in a vapor phase so that no droplets of liquid are entrained in the stream of air delivered to the enclosure. The temperature of the air delivered to the enclosure may be regulated by starting and stopping the rotation of the wheel 28 or by starting and stopping the water pump 60 as required.

Figure 7:
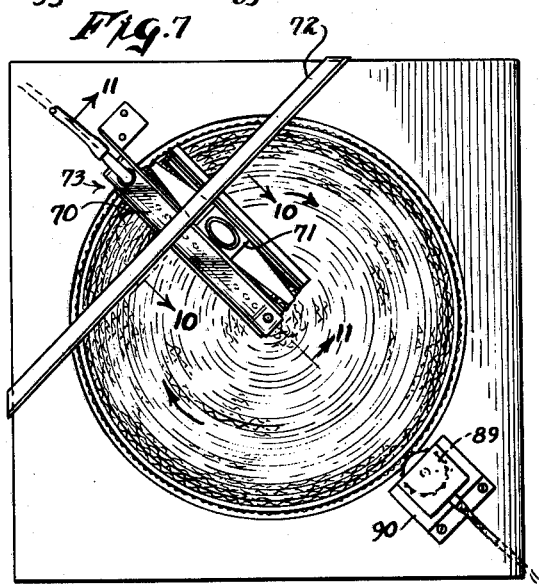
FIGURE 7 is a plan view of a gas and liquid contact apparatus of modified construction in which the wheel rotates in a horizontal plane and showing the radial liquid and air distributing means overlying one side of the wheel.
Figure 8:
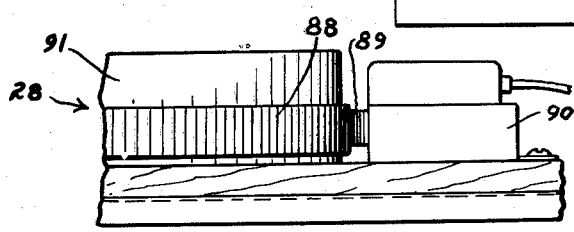
FIGURE 8 is a side elevational view showing the wheel and drive.

FIGURES 7 to 11 illustrate an evaporative cooler of a modified construction in which the wheel 28 rotates in a horizontal plane about a vertical axis. This modified form of apparatus may be mounted in an opening in the floor of a room in the manner of a register, or may be used as one stage of a vertically arranged air conditioning apparatus having a regenerative moisture transferrer and/or sensible heat transferrers. The modified construction comprises a rectangular casing 12 and partition wall 44 of the same general construction as previously described. The wheel 28 also is of a construction identical with the vertically mounted wheel illustrated in FIGURES 1 to 7. In the modified construction, however, the liquid and air distributing chambers 70 and 71 are supported from a cross strut 72 extending across the frame as shown in FIGURE 7.

Liquid distributing chamber 70 is formed in a hollow arm 73 of elongated rectangular form extending radially of and covering a small area only of the wheel 28. The side of arm 73 adjacent the wheel 28 has a row of liquid distributing holes 74 for delivering water onto the top face of the wheel 28. Air distributing chamber 71 also is in the form of a radial arm supported from strut 72 and positioned adjacent the liquid distributing chamber 70 in the direction of rotation of wheel 28. Air distributing chamber 71 has inwardly inclined side walls 75 and 76, as shown in FIGURE 10, to provide a nozzle-like outlet 77 extending radially of the wheel 28 from its hub 29 to its rim 30 and of a width substantially equal to the width of the passages 27 in the wheel. As shown in FIGURE 10, the opposite ends of the chambers 70 and 71 are sealed at the hub 29 and rim 30 by yieldable seals 78 and 79 of a material, such as sponge rubber. Radially extending wipers 80, 81 and 82 extend from the lower side walls of the chambers 70 and 71 and engage the face of the wheel.

An axle 85 is rigidly mounted on the outer end of the arm 73 forming the liquid distributing chamber 70 as by welding and the axle depends from the arm through the hub 29 of the wheel 28 to provide a center about which the wheel rotates. The wheel 28 has casters 86 at its outer periphery which roll on a ring 87. Wheel 28 also has a ring gear 88 at its outer periphery, see FIGURE 8, which meshes with a pinion 89 driven by a motor 90 through suitable reduction gearing. Instead of the partition wall 44 engaging the periphery of the wheel 28, the modified construction comprises a skirt 91 of a flexible material which depends from the periphery of the wheel into an annular recess 92 in the medial partition wall 93.

Underlying the liquid and air distributing chambers 70 and 71 at the underside of the wheel 28 is a pan 94 into which the surplus water flows from the wheel and which constitutes a sump for supplying water to a liquid distributing pump like that previously described. It will be understood that the pump is connected between an outlet nipple 95 from the pan 93 and an inlet nipple 96 to the liquid distributing chamber 70 as shown in FIGURE 11. It will further be understood that a suitable float controlled supply line will be provided similar to that previously described with respect to FIGURES 1 to 7 to supply water as required. In both modifications a suitable bleed off arrangement may be provided to continuously bleed water from the sump tank to prevent the concentration of mineral salts in the water being circulated.

The apparatus illustrated in FIGURES 7 to 11 operates in substantially the same way as previously described. Water from the liquid distributor 70 flows from the row of liquid distributing holes 74 through the passages 27 in the wheel 28 to flood the passages in a narrow radial segment of the wheel. As the wheel 28 rotates, successive flooded passages are positioned under the air distributing chamber 71 which blows the surplus water from the passages. A fan, not shown, forces air through the passages 27 which evaporates water absorbed in the walls of the passages and thereby cools or humidifies the air delivered to the enclosure.

It will be understood that the apparatus illustrated may be used as a cooling tower for cooling water as well as in air cooler for cooling air. It will further be understood that the absorbent mass may be held stationary and the liquid and air distributing arm rotated with respect to the mass to supply liquid and gas to the mass successively. Instead of a single arm for supplying both liquid and gas, separate angularly spaced arms may be provided for the liquid and gas, respectively.

It will now be observed that the present invention provides an improved gas and liquid contact apparatus in which the contacting surfaces of the packing are continuously washed to prevent the accumulation of scale and slime. It will also be observed that the present invention provides an arrangement for evaporating a liquid into a gas in a vapor phase without entrainment of liquid droplets into the stream of gas. It will still further be observed that the present invention provides a gas and liquid contact apparatus which is of simple and compact construction, economically manufactured and one which is reliable in operation and adapted for use over long periods of time without repair or replacement of the packing or any decrease in the capacity of the unit.

While two embodiments of the apparatus are herein illustrated and described, it will be understood that further changes may be made in the construction and arrangement of elements without departing from the spirit or scope of the invention. Therefore, without limitation in this respect the invention is defined by the following claims:

I claim:

1. An air conditioning unit comprising a casing having an opening therein, spaced hollow arms projecting from one side of the casing to overlie the opening at opposite sides thereof, at least one of the arms mounting an axle, a wheel mounted to rotate on the axle in the opening between the arms, said wheel comprising a packing of absorbent material having passages extending therethrough from one face to the other, means for rotating the wheel, liquid distributing means in the arms for flowing water through the passages as they pass between the arms, and means for passing a stream of air to be treated through the passages in the wheel for evaporating the water absorbed by the packing in the wheel, said casing comprises a hollow base formed to provide a sump, the spaced arms projecting upwardly from the base at opposite sides of the wheel and having partitions forming a tortuous path through the wheel radially thereof, and the liquid distributing means comprises the sump, a pump and connections for delivering water from the sump to one of the arms adjacent the axle for flow radially through the tortuous path back and forth through the passages in the wheel from the axle to the base, one of the arms has partitions forming an air distributing chamber extending radially of the wheel adjacent the liquid distributing means, a blower for delivering air to the chamber under pressure, and a baffle plate extending from the arm at the opposite side of the wheel and overlying the passages in the wheel through which the air is blown.

2. An air conditioning unit comprising, a casing, a liquid chamber in said casing, a wheel mounted for rotative movement above the liquid chamber, said wheel comprising a packing of absorbent material having passages extending through it from one face to the other, a motor having a housing constituting the axis of rotation for the wheel, a fan driven by the motor for passing a stream of air through the passages in the wheel, spaced hollow arms extending upwardly from the top of the liquid chamber, said arms being disposed at the opposite sides of the wheel, the arms having open sides facing the sides of the wheel, partitions in the arms for dividing them into separated water and air passages, means for supplying a flow of air through the air passages, a pump for supplying water from the liquid chamber to the water passage in the arms, and baffles in the arms for causing the water flow to follow a devious path through the water passage in the arms and through the passages in the wheel.

3. In an air conditioning unit, a rotative wheel of absorbent material having passages extending through it, a hollow arm at each side of the wheel, each arm having an open side directed toward the wheel, each arm being partitioned to divide it into two chambers, water supply means leading into one of the chambers in the first of the arms and adapted to force water thereinto and through passages in the wheel and through one of the chambers in the second arm, an air supply means for forcing air into the second chamber of the second arm and through water-laden passages of the wheel and into the second chamber of the first arm.

4. In a gas and liquid contact apparatus, a casing, a body of absorbent material in the casing and having passages extending through it, liquid-distributing means operative from one side of the body of absorbent material and against a face of the body, a gas distributing means operative on the body of absorbent material and against a face of the body and located adjacent to the liquid-distributing means, means for moving the body of absorbent material relatively to said gas and liquid distributing means to cause the liquid-distributing means to fill the passages with liquid and to then cause the gas distributing means to blow liquid from the passages, means for continuously passing a stream of gas to be treated through the passages to contact with the liquid absorbed by the body of absorbent material, and means for isolating the flow of liquid-blowing gas from the flow of the gas to be treated so that the gas to be treated reaches only the parts of the body of absorbent material from which excess liquid has been blown.

5. The structure as set forth in claim 4 in which said body of absorbent material is mounted on a fixed axis of rotation, said gas and liquid means being disposed in radially extending relation with respect to the axis of rotation of said absorbent body.

6. The structure of claim 5 in which the axis of rotation of said body of absorbent material is generally vertically disposed, and is rotatable in a generally horizontal plane.

7. The structure of claim 5 in which the axis of rotation of said body of absorbent material is generally horizontally disposed and said body of absorbent material is rotatable in a generally vertical plane.

References Cited in the file of this patent

UNITED STATES PATENTS

| | | |
|---|---|---|
| 2,023,965 | Lysholm | Dec. 10, 1935 |
| 2,286,480 | Farr | June 16, 1942 |
| 2,631,831 | Robic | Mar. 17, 1953 |
| 2,681,208 | Boestad et al. | June 15, 1954 |